Nov. 18, 1958        H. H. MARUM        2,860,499
SOLID COLOR PATTERN KNITTING MACHINE AND METHOD
Filed April 28, 1951        6 Sheets-Sheet 1

Inventor:
Hans H. Marum,
by Maxwell Fish
Attorney

Nov. 18, 1958  H. H. MARUM  2,860,499
SOLID COLOR PATTERN KNITTING MACHINE AND METHOD
Filed April 28, 1951  6 Sheets-Sheet 2

Inventor:
Hans H. Marum,
by Maxwell Fish
Attorney

Nov. 18, 1958  H. H. MARUM  2,860,499
SOLID COLOR PATTERN KNITTING MACHINE AND METHOD
Filed April 28, 1951  6 Sheets-Sheet 4

Inventor:
Hans H. Marum,
by Maxwell Fish
Attorney

Nov. 18, 1958  H. H. MARUM  2,860,499
SOLID COLOR PATTERN KNITTING MACHINE AND METHOD
Filed April 28, 1951  6 Sheets-Sheet 6

Inventor:
Hans H. Marum,
by Maxwell Fish
Attorney

United States Patent Office 2,860,499
Patented Nov. 18, 1958

2,860,499

SOLID COLOR PATTERN KNITTING MACHINE AND METHOD

Hans H. Marum, Andover, Mass., assignor, by mesne assignments, to H. E. Crawford Company, Inc., Kernersville, N. C., a corporation of North Carolina Application April 28, 1951, Serial No. 223,521

10 Claims. (Cl. 66—14)

The present invention relates to improvements in a circular knitting machine arranged for the knitting of hosiery and other fabrics wherein the same are ornamented in what is known as solid color patterns.

The invention is herein disclosed as embodied in a double cylinder rib top knitting machine adapted for both rotary and reciprocatory knitting. The needle cylinders are rotated with relation to a stationary feed station and with relation to the various needle knitting and control cams by means of rotary and reciprocatory driving connections to the needle cylinders including a clutching device shiftable between alternative rotary and reciprocatory knitting positions. The machine is further provided with the usual half long and half short needle slider knitting butts, and with the usual pattern controls for the knitting of conventional patterns, including heel and toe pockets on the machine.

It is a principal object of the invention to provide a novel and improved machine of the general type referred to, which is particularly constructed and arranged for the knitting of a block diamond pattern fabric.

It is a further object of the invention to devise a novel and improved method of knitting a diamond pattern fabric on a circular knitting machine of the character described whereby the machine is adapted for knitting the patterned fabric referred to in a continuous automatic operation.

Other objects of the invention relate more specifically to improvements in the construction and cooperative arrangement of the several operating mechanisms and pattern controls of the machine which contribute to the making of a machine which is capable of operating in the novel manner herein described for the production of a diamond pattern fabric but with a minimum of change and complication from machines of standard construction.

With these and other objects in view as may hereinafter appear, a feature of the invention consists in the provision of a clutching device in the reciprocatory driving connections for the needle cylinders which is responsive to the dictation of the pattern mechanism of the machine during reciprocatory knitting to shift the limits of reciprocatory movement of the cylinder with relation to the feed station and associated needle knitting and control cams for the knitting of the various portions of the diamond pattern at different locations about the needle cylinder. In the preferred form of the invention illustrated, a clutching device is employed in the reciprocatory driving connections having four engaging positions, one for each successive 90° shift in the position of the needle cylinder.

Another feature of the invention consists more specifically in the construction and arrangement of the cylinder clutch to provide alternative rotary and reciprocatory knitting positions and an intermediate position to which the clutch is moved to permit successive shifts in the position of the cylinder with relation to the driving clutch during reciprocatory knitting.

Another feature of the invention consists in the construction and arrangement of the several knitting needle operating and control cams and of needle operating slider butts cooperating therewith whereby the machine is conditioned upon each successive shift of the needle cylinder with relation to its reciprocatory driver for the knitting of the next succeeding portion of the diamond pattern.

The several features of the invention including the method of operation set forth will be readily understood by one skilled in the art from the following description taken in connection with the accompanying drawings, in which:

Figs. 12 to 17, inclusive, are diagrammatic views showing the paths of movement taken by the needle sliders and associated butts for different positions of the needle cams during the operation of the machine in the knitting of the illustrated stocking in which Fig. 12 shows the operation of the needle slider butts during ordinary knitting, Fig. 13 shows the operation of the needle slider butts of the lower cylinder only when alternate needles are transferred to the upper cylinder for the making of the 1 x 1 rib top, Fig. 14 shows the operation of the needle slider butts at the beginning of the first half diamond 232 of Fig. 11 in which the long butt needles are thrown up to their inoperative position and knitting proceeds on the short butt needles only, Fig. 15 shows the operation of the needle slider butts preparatory for the knitting of the second half diamond 234 in Fig. 11 in which the long butt needles are being drawn down into operative position while the short butt needles remain in their high inactive position, Fig. 16 shows the operation of the needle slider butts for the knitting of the first full diamond 236 in Fig. 11 in which all of the needle sliders and needles are out of operation, and the apex cam is rendered operative to draw down into operative position a small group of four sliders and starting or apex needles, and Fig. 17 shows the operation of the slider butts preparatory for the knitting of the last half diamond 240 in Fig. 11 in which the long butt slider actuated needles, having completed the knitting of the half diamond 238, are being moved to an inoperative position by means of the long butt raise cam; and Figs. 18 to 25, inclusive, are a series of detail views illustrating the several different forms of slider used in the diamond pattern stocking of Fig. 11, in which Figs. 18 and 19 show two long knitting butt sliders and Figs. 20 and 21 show two short knitting butt sliders for knitting rib fabric as indicated by the reference characters 210 and 212 indicated also in Fig. 15, and Figs. 22 to 25, inclusive, show the four apex needle sliders with butts 226 indicated also in Fig. 16, each with a long lower butt for starting the first full diamond, being respectively the two long knitting butt sliders and two short knitting butt sliders, disposed at adjacent ends of the needle slider long butt and short butt series.

The invention is disclosed in a preferred form as embodied in a double cylinder rib knitting machine, which may be of ordinary description, having a base 30, an upper supporting frame 32, and a horizontally arranged top plate 33 which provides support for the several needle control cams and the cam actuating devices disposed about the lower portion of the needle cylinder assembly.

The illustrated machine has two opposed needle cylinders consisting of a lower needle cylinder 34 and an upper needle cylinder 36, and double ended latch needles which may be of ordinary description for rib knitting. Illustration of the upper cylinder and the associated needle control cams has been omitted since this mechanism forms specifically no part of the present invention.

Figures 1, 11:
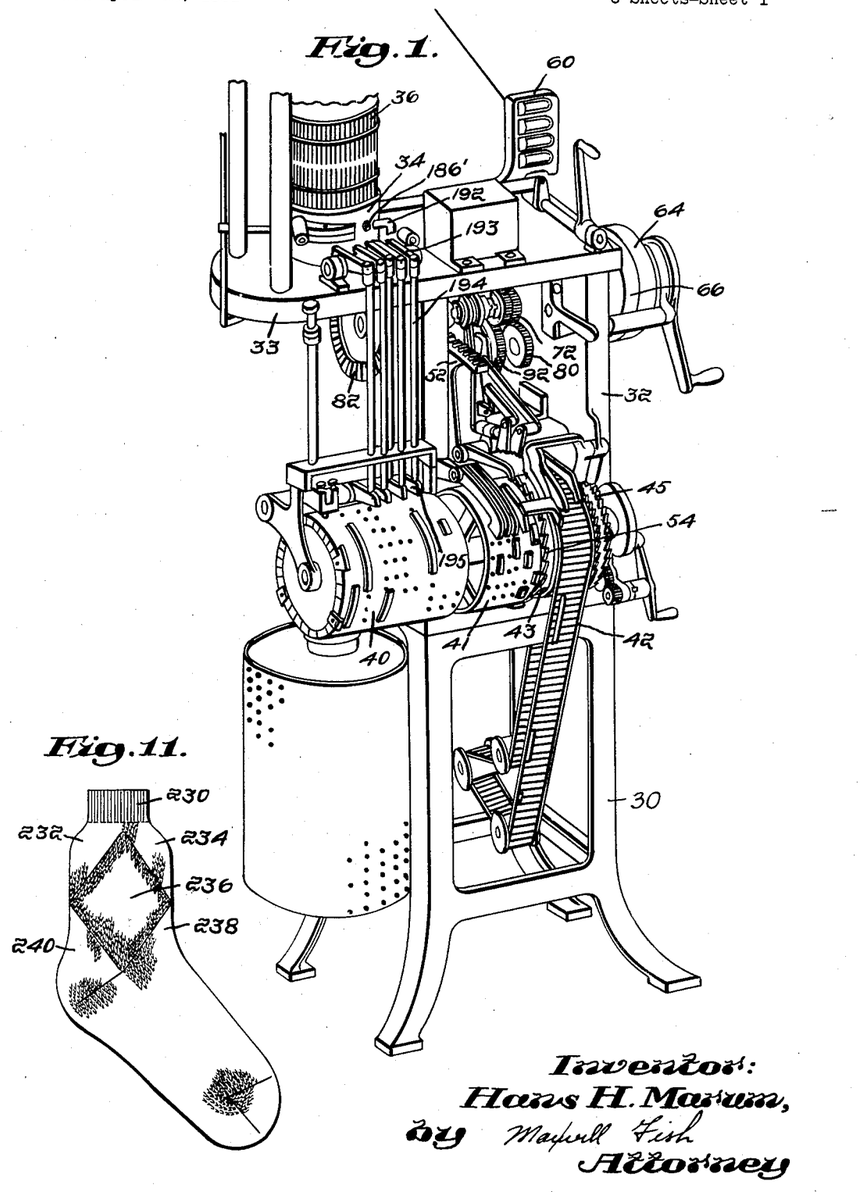
Fig. 1 is an isometric view of a circular rib knitting machine embodying in a preferred form the several features of the invention.
Fig. 11 is a somewhat diagrammatic view of a stocking knitted on the illustrated machine in accordance with the invention.

The pattern control mechanism of the machine as shown in Fig. 1 comprises two pattern drums 40, 41 mounted in axial alignment to turn about a horizontal axis on a shaft 44 and a pattern chain 42 which is arranged to ride about a drum 43 on the same axis with drums 40, 41. A stepped advancing movement is imparted to the drums 40, 41, and 43 and their supporting shaft 44 by means of a ratchet 45 and pawl 46 (see Figs. 5 and 6) connected with one arm of a continuously reciprocated cam actuated lever 47, the other arm of which engages in a cam track 48 formed in one face of a continuously driven bull gear hereinafter described. A more rapid advancing movement is at times imparted to the pattern drums by means of a booster pawl 50 mounted on a continuously reciprocating rocker arm 52 forming a part of the reciprocating drive for the needle cylinder hereinafter referred to, and a ratchet 54 on the shaft 44. The advancing movement of the pattern drum is timed to take place at the start of the rearward movement of the rocker arm 52 which corresponds with the beginning of a reverse clockwise reciprocatory movement imparted to the needle cylinder.

Yarn is fed to the machine at a single feeding station. In the illustrated form of the device a single yarn feed is employed, and the color or other desired change of thread characteristic is effected by means of a conventional knot tier indicated at 60 which cuts off and ties in selected yarns at desired intervals during the operation of knitting a stocking blank on the machine. The knot tier may be similar to that shown for example in the U. S. patent to Larkin, No. 1,726,396. It will be understood, however, that any well known yarn changer may be employed for changing the feeding yarn.

Figure 2:
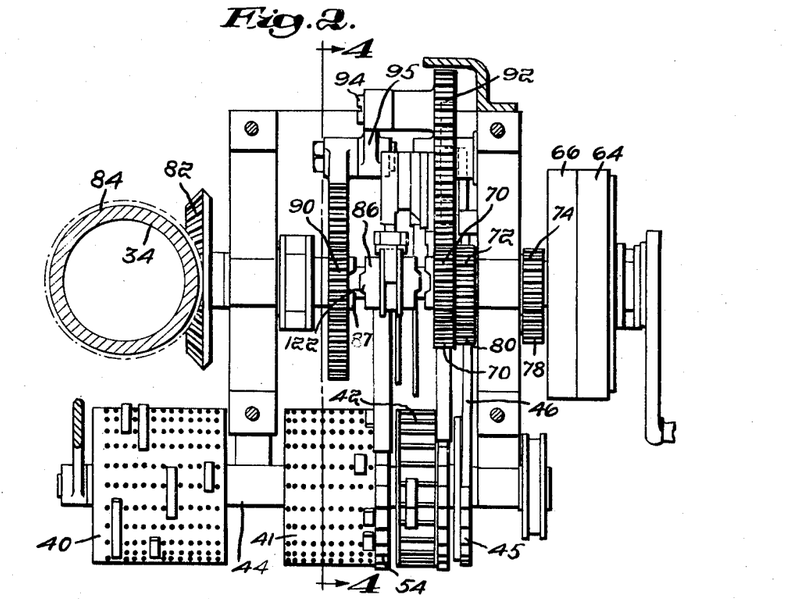
Fig. 2 is a detail plan view of the machine taken on a line passing beneath the cylinder supporting table and illustrating particularly the pattern drums, and the driving connections for rotating the needle cylinders and for imparting stepped indexing movements to the drums.
Figures 3, 5:
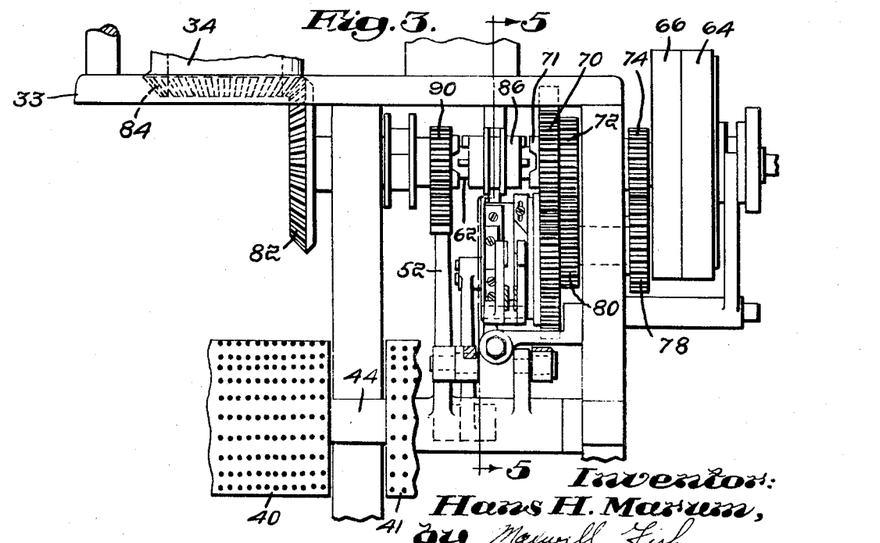
Fig. 3 is a detail view in front elevation of substantially the parts shown in Fig. 2 but with a portion of the pattern mechanism broken away in order to illustrate underlying portions of the needle rotary and reciprocatory clutch shift mechanism.
Fig. 5 is a vertical section taken on a line 5—5 of Fig. 3.

The driving mechanism for the machine comprises a horizontally disposed drive shaft 62 mounted in bearings in the upper portion of the frame 32. A high speed belt pulley 64 and a low speed belt pulley 66 are loosely supported to turn coaxially with the shaft 62. The belt pulleys 64, 66 may be connected by means of a driving belt (not shown) with any convenient source of power. The high speed driving pulley 64 is connected by means of a sleeve, not shown, with a driving clutch gear 70 loose on the shaft 62 and having a driving clutch face 71 formed thereon. The low speed driving pulley 66 is connected through speed reducing gearing with a pinion 72 which is connected through an overrunning clutch not specifically illustrated to drive the clutch gear 70 at a reduced rate of speed. The speed reducing gearing referred to is shown in Figs. 2 and 3 and comprises a pinion 74 integral with the low speed pulley 66, a countershaft 76 and pinions 78, 80 mounted on the countershaft and meshing respectively with the driving pinion 74 and driven pinion 72.

The needle cylinders are directly connected to be driven from the drive shaft 62 by means of a bevel gear 82 on the shaft 62 which meshes with a ring bevel gear 84 carried on the lower end of the needle cylinder 34. A clutch sleeve 86 keyed to turn with and slideable on the shaft 62 for one position of the clutch sleeve meshes with the clutch face 71 of gear 70 to drive the cylinders continuously in a counterclockwise forward knitting direction.

A reciprocatory driving movement is imparted to the needle cylinders 34 and 36 for an alternative operating position of the clutch sleeve 86 in which the clutch sleeve engages with the clutch face 87 of a continuously reciprocatory driving clutch gear 90 supported to turn on the drive shaft 62. The driving connections for imparting a reciprocatory driving movement to the driving clutch gear 90 comprise a bull gear 92 carried on a stub shaft 93 and arranged to mesh with the driving clutch gear 70, a crank pin 94 on one face of the bull gear, a connecting link 95, and the rocker arm 52 arranged to turn on a pivot shaft 97, and having segmental gear teeth which mesh with the clutch gear 90. The clutch gear 90 is formed with a four position clutch face for engagement with a four tooth face on the clutch sleeve member 86.

The arrangement of the reciprocatory driving connections is such that the forward movement of the rocker arm 52 causes the needle cylinder to rotate 360° in a counterclockwise forward knitting direction. The rearward movement of the rocker arm 52 causes the needle cylinder to rotate 360° in a clockwise reverse knitting direction. The clutch shift mechanism hereinafter described causes the shift of the clutch sleeve from either engaging position to take place at the beginning of the forward movement of the rocker arm 52.

Figure 4:
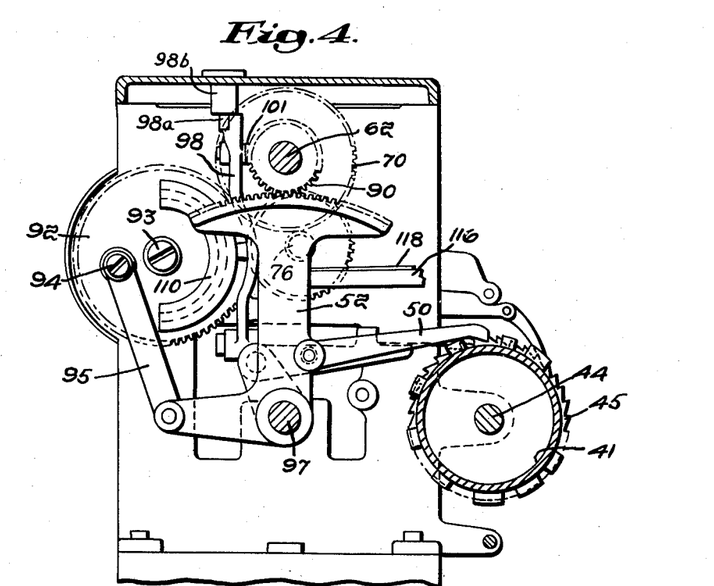
Fig. 4 is a vertical section taken on a line 4—4 of Fig. 2.
Figure 5:
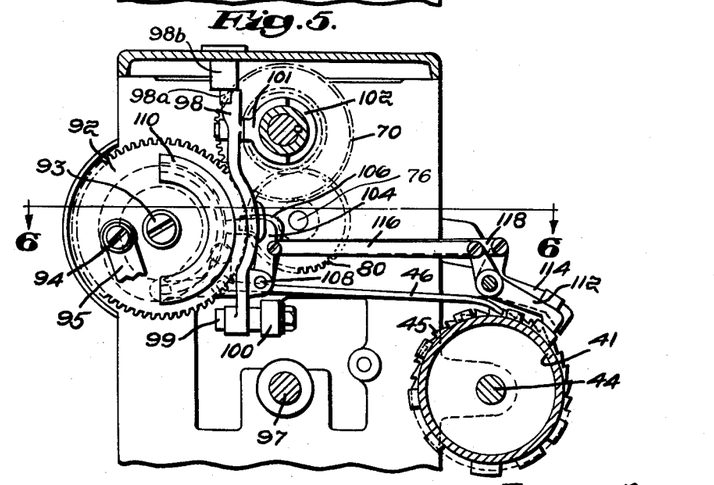

For changing between the rotary knitting and reciprocatory knitting on the machine, a pattern controlled clutch shifting mechanism is provided for shifting the clutch sleeve 86. This mechanism comprises a vertically arranged clutch shifting lever 98 pivotally mounted at its lower end on a pivot pin 99 carried on a bracket 100 on the machine frame (see Fig. 5) and having at its upper end a clutch shifting shoe 101 which rides in a groove 102 in the periphery of the clutch sleeve 86. The clutch shifting lever 98 and with it the clutch sleeve 86 are shifted in one direction or the other by means of two shifter pawls 104, 106 supported on a pivot 108 on the shifter lever 98 and arranged to be moved selectively rearwardly into the path of shifting cams carried in a semi-circular cam block 110 mounted on the hub of the bull gear 92. Movement of the shifter pawl 104 inwardly toward the axis of the bull gear 92 causes the pawl 104 to be engaged by side cams on the cam block 110 to shift the pawl 104, shifting lever 98 and clutch sleeve 86 to the right toward engagement with the clutch face 71 of the cylinder continuously rotating driving clutch member 70. Movement of the pawl 106 inwardly toward the axis of the bull gear 92 causes the pawl 106 to be engaged by side cams which shift the clutch assembly including clutch sleeve 86 to the left toward engagement with the cylinder reciprocating clutch driving gear 90. The pawls 104 and 106, for added support, are arranged to pass through supporting slots formed in the shifter lever 98. The extreme upper end of the shifter lever 98 is engaged by a downwardly extending detent 98a (Figures 4 and 5). The detent 98a is mounted for vertical sliding movement in a suitable housing 98b suitably secured to the upper portion of the frame 32 and the detent 98a is urged downwardly by a spring, not shown, mounted in the housing 98b. The detent 98a acts as a friction lock to hold the shifter lever 98 in the position to which it is shifted by either of the shifter pawls 104 or 106. Pattern controlled connections are provided for effecting movement of the shifter pawls 104, 106 into and out of operative engagement with the shifter cams referred to. Said connections consist of pattern levers 112, 114 which are connected respectively by links 116, 118 with the pawls 104, 106 and are formed at their free ends with contact surfaces for engagement with bumps disposed on the pattern drum 41.

In accordance with the present invention a novel and improved clutching and control mechanism is provided for clutching the reciprocating cylinder successively in different relations to the reciprocating driving mechanism, which operates in accordance with the dictation of the pattern mechanism of the machine to change the driving relation between the cylinder and its reciprocatory driving mechanism and thereby to shift the limits of the reciprocatory movement with relation to the single feed station and with relation to the various needle operating cams located with relation to said station about the knitting cylinder. The needle operating cams are controlled by the pattern mechanism simultaneously with the clutch shift during reciprocatory knitting to cause the machine to knit in succession mating portions of a diamond or similar block pattern in the fabric.

In the construction specifically illustrated in the drawings, the clutch sleeve 86 is keyed to and is slidable on the drive shaft 62 between the rotary knitting driving clutch gear 70 and the cylinder reciprocating driving clutch gear 90 to provide alternate clutching positions and additionally an intermediate neutral position as indicated for example in Figs. 2 and 3. The reciprocating clutch gear 90 is formed with a clutch face 87, and the clutch sleeve 86 is similarly provided with a cooperating clutch face 122, said clutch faces being notched to provide four alternative engaging positions of the clutch sleeve 86 with relation to the reciprocating clutch gear 90, which are disposed 90° apart so that the clutch sleeve may be brought into clutching engagement with the reciprocating driving gear in each of the four equally spaced apart angular positions.

The clutch shift mechanism of the illustrated machine is operable to shift the clutch sleeve 86 from one to the other clutching position and is alternatively operable to shift the clutch sleeve 86 from the position of clutching engagement with the reciprocating clutch gear 90 to the intermediate neutral position and then back into engagement with the reciprocating clutch gear 90 in timed relation to the rotation of the clutch gear 90 in order to secure either a 90° or 180° shift in the position of the driven clutch sleeve with relation to the reciprocating driving gear 90 and clutch face 122. In order to shift the clutch sleeve 86 to the several positions required in timed relation to the operation of the machine, lateral shift cams of different heights are provided on the cam block 110 disposed at different levels or distances radially from the axis of rotation of the bull gear 92, and means are provided which operate in accordance with the dictation of the pattern mechanism of the machine for controlling the inward movement of the shift pawls 104, 106 to cause one or the other of said pawls to be brought into engagement with the proper shift cam.

The construction and arrangement of the clutch shifting cam mechanism will be described particularly in connection with Figs. 6 to 10, inclusive. Movement of the clutch sleeve member 86 to the left into clutching engagement with the reciprocating driving gear 90 is effected by movement of the pawl 106 inwardly toward the axis of the cam segment 110. As best shown in Figs. 8 and 9, movement of the pawl 106 inwardly by different amounts will cause the pawl to be engaged selectively with any one of three side shift cams 126, 128, 130 on the cam block 110, each of which acts through the pawl 106 and shift lever 98 to move the clutch sleeve 86 into clutching relationship with the reciprocatory driving gear 90. Cam 130, rendered operative by an extreme inward movement of the pawl 106, is utilized for a shift from rotary to reciprocatory knitting and acts in such a manner as to effect this shift without changing the angular driving relationship of the driving and driven parts. The cam 128, rendered operative by movement of the pawl 106 inwardly to an intermediate position, is employed to shift the clutch sleeve from its intermediate neutral position back into engagement with the reciprocatory driving gear 90 after a dwell period in which the reciprocatory driving gear 90 will have moved 90° out of position with relation to its driven parts, including the needle cylinder. The side cam 126 which is rendered operative by a relatively small inward movement of pawl 106 is utilized to return the clutch sleeve 86 from its intermediate neutral position to a position of driving engagement with the reciprocatory clutch gear 90 after a dwell period in which the reciprocatory driving gear 90 will have moved 180° out of position with relation to the driven parts including the needle cylinder. The extent of the inward movement of the pawl 106 is controlled by means of bumps of corresponding heights located in a clutch shift pattern drum channel 141 on the pattern drum 41.

The clutch shifting pawl 104 is similarly arranged for movement inwardly to three alternative positions for selective engagement with a group of three cooperating side shift cams 132, 134, and 136 on the cam block 110, which are employed to shift the clutch sleeve member 86 out of engagement with the reciprocatory driving clutch gear 90 to an intermediate neutral position, or alternatively into a clutching relation with the rotary driving clutch gear 70.

The clutch sleeve 86 is shifted to the right from its position in engagement with the reciprocatory driving gear 90 by means of the clutch shifting pawl 104 which is arranged to cooperate selectively with any one of the three cooperating side shift cams 132, 134, and 136 on the left side of the cam block 110 (see particularly Figs. 7 and 8). It will be noted that the three cams 132, 134, and 136 have cammed end surfaces superimposed one upon the other so that the shifting of the clutch sleeve member 86 is effected always for the same angular position of the cam block 110. The cam 136 which is rendered operative by movement of pawl 104 to its extreme inward position acts to shift the clutch sleeve 86 to its fullest extent into engagement with the rotary driving gear 70 in order to condition the machine for rotary knitting. Movement of pawl 104 inwardly to either of its other two operating positions into selective engagement with cam 132 or 134 causes the clutch sleeve 86 to be shifted to its intermediate neutral position. Cam 134 acts in conjunction with cam 126 which, as previously noted, shifts the clutch sleeve back into engagement with the reciprocatory driving gear 90 after a 180° dwell period of the needle cylinder. Side cam 132 cooperates with side cam 128 which causes the clutch sleeve 82 to be returned from its neutral position into engagement with the reciprocatory driving gear 90 after a 90° dwell period of the needle cylinders.

Figure 6:
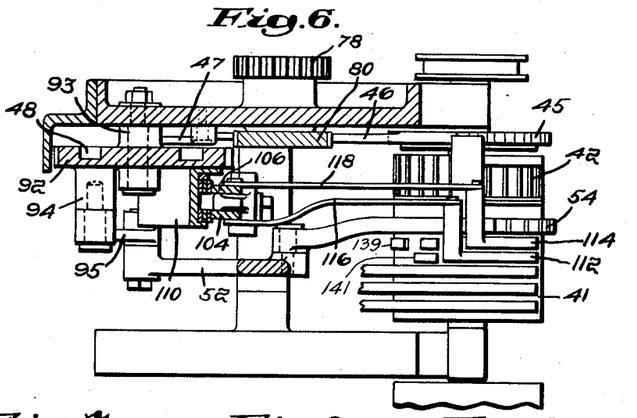
Fig. 6 is a sectional plan view taken on a line 6—6 of Fig. 5.
Figures 7, 8, 9, 10:
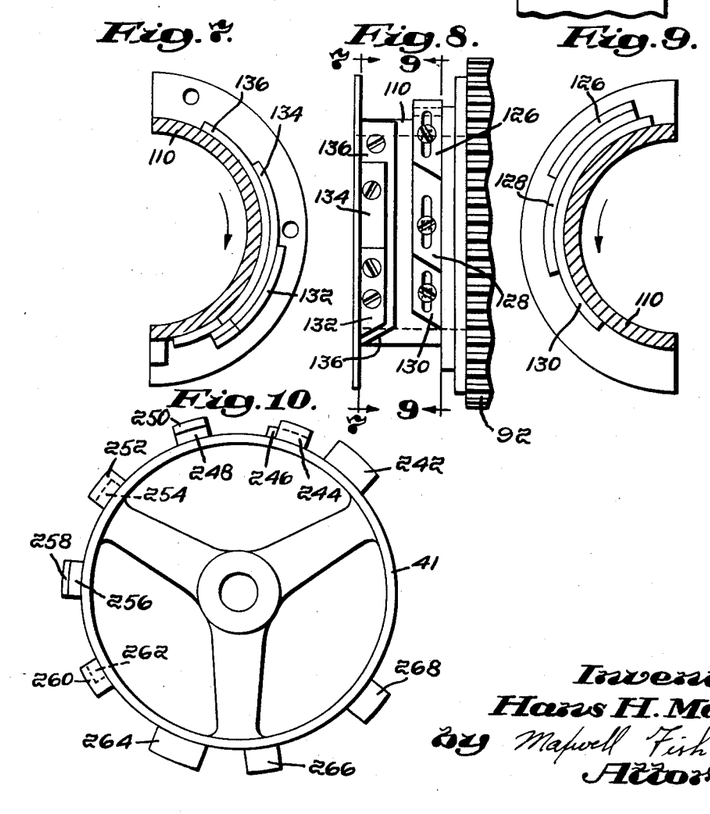
Figs. 7, 8, and 9 are details of the clutch shifting cam drum, Fig. 8 being a view in front elevation of the drum, Fig. 7 being a vertical section taken on line 7—7 of Fig. 8 showing the cams at the left side of the drum, and Fig. 9 being a vertical section taken on a line 9—9 of Fig. 8 showing in side elevation the cams at the right side of the drum.
Fig. 10 is a detail view of one of the pattern drums showing specifically the arrangement of the bumps for controlling the clutch shift pawls.

The position of each of the clutch shift pawls 104, 106 is determined in order to control the shifting of the clutch sleeve 86 by means of bumps which may be of three different heights located respectively in two pattern channels indicated generally at 139 and 141 in Fig. 6 on pattern drum 41 for engagement beneath the respective pawl levers 112, 114. A high bump in either channel will cause the respective pawl to move into the path of the innermost cam toward the axis of rotation of the cam block 110. A medium height bump will cause the respective pawl to engage with the intermediate cam of the series and a low bump will cause the pawl to be moved into the path of the outermost cam of the series. A more detailed operation of the arrangement and operation of the clutch shifting pawls will be found in the following statement of operation of the machine.

In the illustrated machine the shifting of the limits of reciprocatory movement of the needle cylinder during continued reciprocatory knitting is coordinated by pattern means with the operation of the needle control cams associated with the single yarn feed station for the knitting of successive portions of the diamond block pattern. While the invention is herein illustrated in connection with the use of one yarn feeding station only, it will be understood that the invention contemplates the employment of two or more such yarn feeding stations which, among other advantages, would permit of substantially greater complication of the diamond pattern being knitted, and by the simultaneous use of such feeds, would permit the simultaneous knitting of portions of the diamond pattern at different locations about the needle cylinder.

A further valuable feature of the invention consists in the combination of the cylinder shift mechanism and associated pattern control of the needle operating cams herein disclosed with the elements of a double cylinder rib knitting machine adapted for the knitting of rib top hosiery, whereby a machine of greater versatility and usefulness is produced. The invention in its broader aspects is not, however, limited to the embodiment in a double cylinder rib top knitting machine.

The needle knitting and control cams of the illustrated machine as shown in the diagrammatic developed views, Figs. 12 to 17, inclusive, of the drawing include the following: a center cam 150, a guard cam 152, right and left stitch cams 154, 156, right and left hand narrowing picks 158, 160, landing cams 162, 164, an intervening guard cam 166, a long butt raise cam 168, long butt draw-down cam 170, right and left hand widening picks 172, 174, a leveling cam 176, a long butt leveling cam 178, a dividing cam 180, a full butt transfer cam 182, transfer butt leveling cam 184, an apex cam 186, and a number of guard cams designated respectively at 187, 188, 189, 190, and 191.

The apex cam 186 acts during the first part of a reverse clockwise movement of the cylinder during reciprocatory knitting, being moved into position at the start of this reverse needle movement to activate only that group of apex needles which are centrally located with respect to the reciprocatory movement of the cylinder. The apex cam is then immediately withdrawn. In the present instance this forward movement and immediate withdrawal of the apex cam is accompanied by the use of a very short pattern bump which acts at the start of the reverse movement of the needle cylinder to engage and then to release the apex cam.

It will be understood that certain of the operating and control cams above noted and illustrated in the developed views 12 to 17, inclusive, are moved radially inwardly and outwardly with relation to the needle cylinder in order to bring these cams into and out of operative engagement with the respective needle slider butts. Inasmuch as the construction and arrangement of the cam supporting and actuated devices including the pattern drum operated controls therefore may be of standard construction well known in the art, the diagrammatic illustration of Figs. 1 and 12 to 17 is believed sufficient to illustrate the connection of the present invention therewith.

The arrangement of the pattern controls is generally indicated in Fig. 1. The connections for shifting the apex cam 186 of the present construction are as follows: A spring seated butt 186' of apex cam 186 is arranged to be acted upon by a rocker arm 192 which is carried on a rock shaft, not shown, horizontally disposed on the cylinder supporting plate 33. A second arm on the rock shaft is engaged by a rearwardly extending arm of a rocker lever 193 which is in turn connected by means of a downwardly extending link 194 with a pattern lever 195. An appropriate bump on the pattern drum 40 by raising the pattern lever 195 causes the butt 186' of the apex cam 186 to be moved inwardly into the path of the apex needle slider butts hereinafter referred to.

Figures 18, 19, 20:
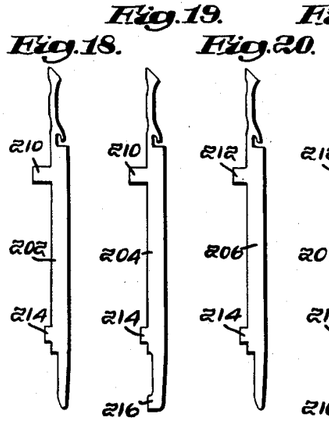
Figures 21, 22, 23, 24, 25:
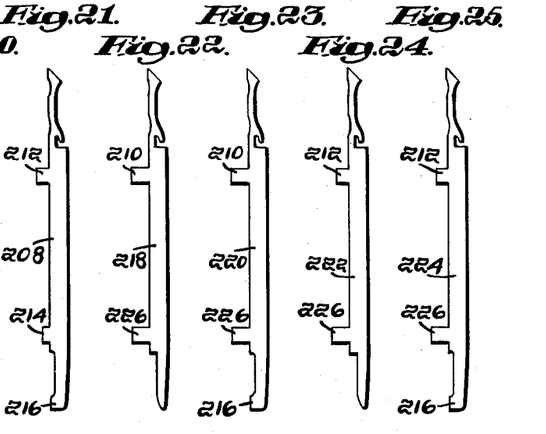

Several different forms of slider employed in the lower needle cylinder 34 are shown in Figs. 18 and 25, inclusive, more particularly those which cooperate with the needle actuated cams above described to select and to operate the selected needles. Figs. 18 and 19 illustrate forms of long butt slider, and Figs. 20 and 21 illustrate forms of short butt slider normally employed for rib knitting and for the formation of the heel and toe. Examples of the use of each of the four sliders shown will be found in Figs. 12 and 13, the butts only, however, being shown. Long knitting butt sliders, such as those shown in Figs. 18 and 19, alternate with one another in that portion of the slider series designated as long knitting butt sliders. Short knitting butt sliders, such as those shown in Figs. 20 and 21, alternate with one another in the other half of the slider series. The upper butt of every slider illustrated is the needle knitting butt. The needle sliders in one half of the needle cylinder are formed with long needle knitting butts designated at 210, the needle sliders in the other half of the needle cylinder being formed with short needle butts 212. It will be further noted that each of the sliders shown in Figs. 18 to 21 is formed with a second short rib leveling butt 214 and each alternate slider is formed with a third rib transfer butt 216.

Figs. 22 to 25, inclusive, illustrate sliders which in the illustrated construction are employed to draw down selected groups of apex needles into active operation. These sliders designated respectively at 218, 220, 222, and 224 are similar to sliders 202, 204, 206, and 208 previously described except that in place of the short rib leveling butt 214 each slider is provided with a long apex draw-down butt 226. These four sliders are indicated also in Fig. 16 which shows the apex cam 186 in the process of engaging and drawing down the apex sliders 218, 220, 222, 224. It will be understood that there are similar groups of four apex sliders having long apex butts 226 in each of the four quadrants of the lower needle cylinder 34 to permit the starting of the diamond pattern in each of the four quadrants. While in the illustrated construction a group of four apex needles is shown which will provide an overlap of two needles for the formation of the diagonal suture between the adjacent diamonds, it will be understood that any convenient number of such apex needles may be employed.

The rib top stocking with the solid diamond pattern shown in Fig. 11 and adapted to be knitted on the illustrated machine comprises a 1 x 1 knitted rib top 230 which is knitted on the two opposed cylinders 34, 36 in the normal manner. The rib top together with the two half diamonds 232 and 234 knitted therefrom may be knitted in a single solid color which may, for example, be tan. Following the knitting of the rib top the machine is conditioned for the knitting of a few plain courses and then for reciprocatory knitting of the needles held on the short butt sliders only, with narrowing, until the diamond 232 has been narrowed to a point. By means of the clutch mechanism herein described the cylinder is then shifted 180° with relation to the reciprocatory driving mechanism, the needles held by the long butt sliders are brought down and the second half diamond 234 is produced.

For knitting of the first full diamond designated at 236, the cylinder is shifted through a 90° angle with relation to its driver, and the color of the yarn is preferably changed, as for example, to red, by the operation of the knot tying machine indicated in Fig. 1 of the drawings. The two full diamonds 236 are knitted in this color. For the knitting of the second full diamond (not shown) the needle cylinder is shifted 180° with relation to the reciprocatory driving mechanism, and the operations employed in the first full diamond are repeated.

Upon completion of the second full diamond, the needle cylinder is again shifted 90° with relation to the reciprocatory driving mechanism for the knitting of a half diamond 238 on the long butt needles. For the knitting of the half diamond 238 and the diametrically opposite half diamond 240 together with the heel and foot, still another color yarn may be employed, as for example, blue. For the knitting of the half diamond 238 the needle cylinder is again shifted 90° and the half diamond is knitted on the long butt slider actuated needles. Finally, the needle cylinder is again shifted 180°, the long butt needles are thrown out of operation, and the half diamond 240 is knitted on the short butt slider actuated needles which is followed by the knitting of the heel, foot, and toe portions of the stocking in the normal manner.

It is to be noted that with the method used in the knitting of the stocking illustrated in Fig. 11, the yarn floats around the outside of the needles during the shift in the position of the needle cylinders with relation to the driving mechanism and is then interlaced into the suture along one side so that no loose or broken ends will be produced in the knitting of the pattern.

The operation of the machine including the pattern controlled operation of the cylinder driving clutch and the needle operating cams for the rib top diamond pattern stocking illustrated in Fig. 2 will now be described. The knitting of the stocking starts with the rib top designated at 230 in Fig. 12. The clutch sleeve 86 is engaged with the continuous rotary driving gear 70 so that the needle cylinder is rotating continuously in a clockwise direction. The full butt transfer cam 182 and the transfer butt leveling cam 184 are in operation causing the sliders associated with alternate needles to be moved upwardly to transfer the alternate needles to the upper cylinder for the production of the one x one knitted rib top (see Fig. 13). All the leveling, clear, narrowing pick, widening pick, and apex cams are out of operation.

Upon completion of the rib top 230 the machine is conditioned for the knitting of the first triangular section 232 of the diamond pattern in the following manner: A top transfer cam associated with the upper cylinder and not here shown is rendered operative to return the alternate needles into operative engagement with their sliders in the lower cylinder.

Figure 12:
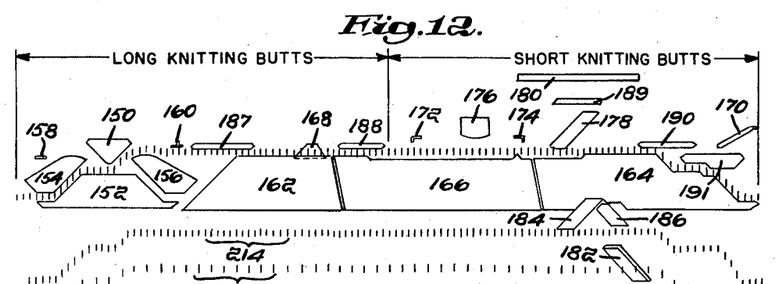
Figure 13:
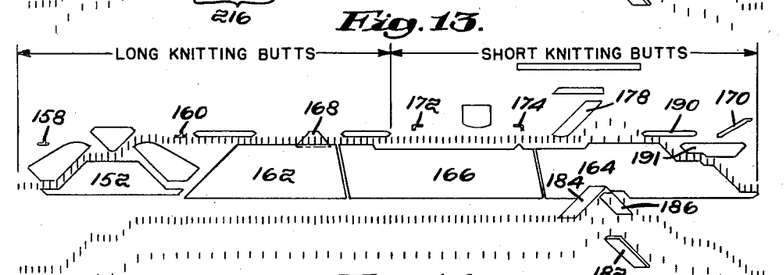
Figure 14:
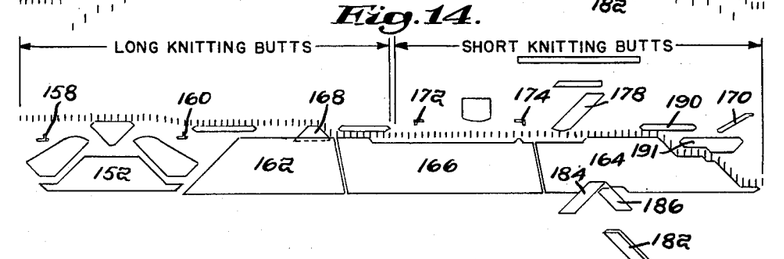
Figure 15:
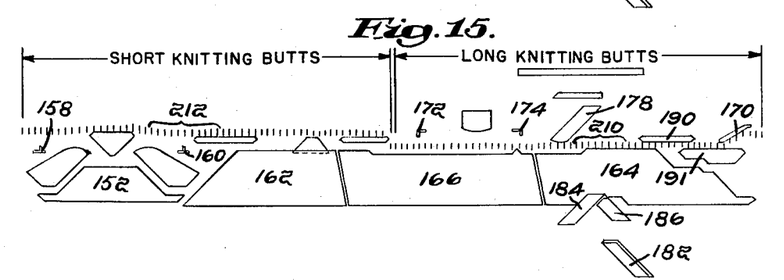
Figure 16:
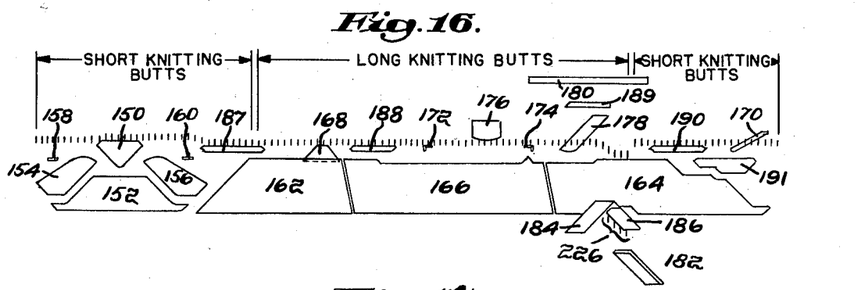
Figure 17:
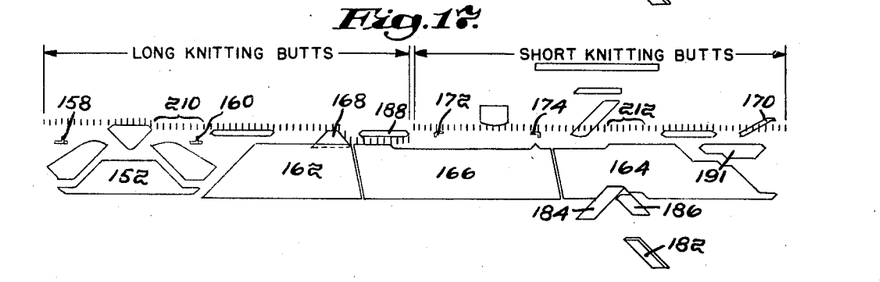

Following a few courses of plain knitting, as shown in Fig. 12, a high bump 242 in pattern channel 141 (see Fig. 10) actuates pattern lever 114 to move pawl 106 to its inmost position in the path of side shift cam 130, thereby shifting clutch sleeve 86 into engagement with the reciprocatory driving gear 90. The long butt raise cam 168 is rendered operative (see Fig. 14) to move the long butt needle sliders and associated needles upwardly to inactive position. The right and left hand narrowing picks 158, 160 are rendered operative. Reciprocatory knitting with narrowing now takes place on the short butt slider needles only until the triangular area 232 has been knitted to a point, and all of the needles are out of operation.

The machine is now conditioned for the knitting of the diametrically opposite triangular section 234 of the pattern. A medium bump 244 in pattern channel 139 and a low bump 246 in pattern channel 141 act upon pattern levers 112 and 114 to position the pawls 104 and 106 respectively in the path of side cams 134 and 126 so that as the reciprocatory driving rocker 52 leaves its rearward dwell position, the clutch sleeve member 86 is shifted to neutral disconnecting the needle cylinder. Upon movement of the rocker 52 and cam block 110 to a position 180° out of phase with the cylinder, side cam 126 becomes operative to shift the clutch sleeve 86 back into engagement with the reciprocatory driver 90. Long butt leveling cam 170 is brought into action during the remaining 180° of rotation of the needle cylinder in the forward counterclockwise direction, causing all the long butt slider needles to be brought down into operative position (see Fig. 15). The right and left hand narrowing picks 158 and 160 remain in operation. The knitting of the second triangular section on the long butt slider actuated needles continues to a point when all the needles are out of operation.

The machine is now conditioned for the knitting of the first full diamond section of the stocking pattern designated at 236. A low bump 248 in pattern channel 139 and a medium bump 250 in pattern channel 141 act through pattern levers 112 and 114 to position pawls 104 and 106 in the path of side cams 132 and 128 respectively so that the clutch sleeve 86 is shifted from engagement with the reciprocatory clutch gear 90 to neutral position in the rearward dwell position of the rocker 52, and is again meshed with the clutch gear 90 when the driving connections including the rocker 52 have reached a position 90° out of phase with the needle cylinder. A change in the color of the feeding yarn now takes effect. The right and left hand narrowing picks 158 and 160 remain in action. The left and right hand widening picks 172 and 174 are brought in. Apex cam 186 is rendered operative and acts during the next reciprocatory movement of the needle cylinder in the reverse clockwise direction to draw down four apex needles which form the starting point of the diamond with sufficient overlap with the previously knitted areas to ensure the formation of a firm suture. The operation of the apex cam is timed with relation to the rotation of the cylinder to cause a middle group of four needles comprising two long and two short knitting butt slider actuated needles to be drawn down. The knitting of the diamond continues until the widest portion of the diamond is reached when half of the long knitting butt slider actuated needles and half of the short knitting butt slider actuated needles are knitting.

For the knitting of the second or narrowing half of the diamond 236, the right and left hand widening picks 172, 174 are removed from operation. The knitting continues until the point of the diamond 236 is completed and all the needles are out of operation.

The machine is next conditioned for the knitting of the second diametrically opposite full diamond section which is similar in shape and color to the diamond 236. A medium bump 252 in pattern channel 139 and a low bump 254 in pattern channel 141 cause pawls 104 and 106 to be placed in the paths respectively of side cams 134 and 126 for moving the clutch sleeve 86 first to its intermediate neutral position and thereafter back into engagement with the reciprocatory driving gear 90 to effect a further 180° shift in the position of the cylinder with relation to its driving mechanism. The color of the feeding yarn remains unchanged. The right and left hand narrowing picks 158 and 160 remain in action. The left and right hand widening picks 172 adn 174 are brought in. Apex cam 186 is rendered operative and acts during the next reciprocatory movement of the needle cylinder in the reverse or clockwise direction to draw down four apex needles which form the starting point of the second diamond. As in the formation of the first described diamond the operation of the apex cam is timed with relation to the rotation of the cylinder to cause a middle group of four needles comprising two long and two short knitting butt slider actuated needles to be drawn down. The operation of knitting the second diamond is a duplication of the operation previously described in the knitting of the diamond 236. The widening operation continues until the widest portion of the diamond is reached when half of the long butt slider actuated needles and half of the short butt slider actuated needles are knitting. Thereafter, the left and right hand widening picks 172, 174 are removed from operation so that narrowing takes place until the point of the diamond is completed and all of the needles are again out of operation.

The machine is next conditioned for the knitting of the half diamond 238. The position of the cylinder with relation to the reciprocatory driving mechanism is again shifted through a 90° angle. A low bump 256 in pattern channel 139 and a medium bump 258 in pattern channel 141 causing pawls 104 and 106 to be shifted respectively into the path of side cams 132 and 128 for shifting the clutch sleeve 86 first to its neutral and then back into engaging position with the reciprocatory driving gear 90. A second change in the color of the feed yarn is now rendered operative to produce the third color element of the stocking designed. The right and left hand narrowing picks 158, 160 remain in action. The left and right hand widening picks 172, 174 are brought in. Apex cam 186 is again rendered operative during the next reciprocatory movement of the needle cylinder to draw down four apex needles which in this instance are the four middle needles of the long knitting butt needle group. These apex needles form the starting point of the half diamond 238. The knitting continues with widening until all of the long knitting butt slider actuated needles extending half way around the needle cylinder are knitting.

The machine is now conditioned for the knitting of the diametrically half opposite diamond section 240 of the stocking. The position of the needle cylinder is again shifted 180° with relation to the reciprocatory driving mechanism through the agency of a medium bump 260 in pattern channel 139 and a low bump 262 in pattern channel 141 which cause pawls 104 and 106 to be positioned in the paths of side cams 124 and 136 respectively. To shift the sleeve member 86 to its neutral position and thereafter back into engagement with the reciprocatory driving gear 90 when the driving mechanism has reached a position 180° out of phase with the cylinder. The long butt raise cam 168 is rendered operative to move the long knitting butt sliders and associated needles upwardly to inactive position (see Fig. 17) so that all the needles are again inactive. The right and left hand narrowing picks 158, 160, the right and left hand widening picks 172, 174 and apex cam 186 are all brought into operation, thus causing the middle four needles of the short knitting butt group to be rendered operative to form the apex of the half diamond 240. Knitting continues with widening until all of the short butt slider actuated needles are in operation, completing this portion of the pattern.

In the stocking design illustrated, the knitting of the heel next takes place. This may be carried out in the conventional manner on the short knitting butt slider actuated needles. Starting with the full half circle of short knitting butt needles the reciprocatory knitting is continued with the right and left hand narrowing picks 158, 160 in operation. The apex cam 186 and the left and right and widening picks 172 and 174 are disengaged. The reciprocating knitting continues until the desired number of narrowings have taken place. Thereafter the left and right widening picks 172, 174 are brought in until all of the short knitting butt slider actuated needles are again in operation to complete the heel.

The machine is now conditioned for the knitting of the foot. A high bump 264 in the pattern channel 139 acts on pawl lever 112 to move pawl 104 to its most inward position in the path of the cam 136, thereby shifting clutch sleeve 86 from its reciprocatory to its rotary knitting position into engagement with the rotary clutch gear 70. The narrowing and widening picks are now out of operation. The long butt leveling cam 178 is rendered operative to render all of the long butt needles operative. Rotary knitting now continues through the knitting of the foot until the toe is reached.

In the design shown for the knitting of the toe, a toe pocket is formed with reciprocatory knitting. The clutch sleeve 86 is shifted to the reciprocatory knitting position in engagement with the reciprocatory clutch gear 90 by means of a high bump 266 in pattern channel 141, the long butt slider actuated needles are thrown out of action, the left and right narrowing picks 158, 160 are rendered operative. After a sufficient amount of narrowing has taken place, the left and right widening picks 172, 174 are thrown in and widening takes place to form the second half of the toe pocket which is then closed by a looping operation.

Finally the clutch sleeve 86 is returned to its rotary knitting position in engagement with the rotary clutch gear 70 through the agency of a high bump 268 in the pattern channel 139 which engages pattern lever 112 and forces pawl 104 inwardly to its extreme position in the path of cam 136.

A preferred form of the invention having been described, what is claimed is:

1. In a circular knitting machine for knitting hosiery and other fabrics ornamented in solid color patterns, a rotatable needle cylinder, independently movable needles in the cylinder, means for supplying yarn to the needles including means for changing the feeding yarn, suitable needle actuating and control devices providing a yarn feeding station, and a driving mechanism for the cylinder including a rotary driver, a reciprocatory driver, and a clutching device in said driving mechanism shiftable between rotary and reciprocatory driving position and to an intermediate neutral position, said clutching device having a plurality of fixed engaging positions with relation to the reciprocatory driver corresponding to a plurality of predetermined angular positions of the needle cylinder with relation to said reciprocatory driver, and a clutch shifting device consisting of a shift lever connected with the clutching device, a pair of shift pawls supported on the shift lever, a continuously driven cam drum having two groups of radially superimposed lateral shift cams arranged for engagement with the respective pawls, and pattern means for controlling the movement of the pawls into engagement with selected lateral shift cams for shifting the clutching device between said rotary and reciprocatory clutching positions and for shifting said clutching device from one to another selected engaging position with said reciprocatory driver.

2. In a circular knitting machine for knitting hosiery and other fabrics ornamented in solid color patterns, a rotatable independent needle cylinder operable for rotary and reciprocatory knitting, a needle cylinder series comprising two equal groups of long and short knitting butt sliders, and with a number of sliders in the middle and at the ends of each group having separate apex butts, needle knitting and control cams including needle narrowing and widening picks and an apex needle drawdown cam, a cylinder driving mechanism including a clutching device shiftable between rotary and reciprocatory knitting positions and further shiftable for effecting selective 90° and 180° shifts in the limits of reciprocatory movement of the cylinder, and pattern actuated devices for shifting said clutching device between rotary and reciprocatory knitting, and for shifting the limits of reciprocatory movement of the cylinder with relation to the needle knitting and control cams for the knitting of complementary portions of a diamond pattern in each shifted position of the needle cylinder.

3. In a circular knitting machine for knitting hosiery and other fabrics ornamented in solid color patterns, a rotatable needle cylinder, independently movable needles in the cylinder, means for supplying yarn to the needles including means for changing the feeding yarn, suitable needle actuating and control devices providing a yarn feeding station, a driving mechanism for the cylinder including a rotary clutch driver, a reciprocatory clutch driver, and a clutching device in said driving mechanism shiftable between rotary and reciprocatory clutch driver engaging positions, and to an intermediate neutral position, said clutching device having four engaging positions with said reciprocatory clutch driver spaced at 90° intervals from one another, and a clutch shifting device consisting of a cylindrical cam hub operatively connected to turn in timed relation with each of said clutch drivers, a group of three radially superimposed side cams on said cam hub for shifting the clutch device at the limit of reciprocatory movement of the cylinder in the forward counterclockwise direction and consisting of an innermost reciprocatory-to-rotary shift cam, and intermediate 180° reciprocatory-to-neutral 90° shift cam, and an outermost 90° reciprocatory-to-neutral shift cam, and a second series of superimposed cams on the cam hub comprising an innermost rotary-to-reciprocatory motion shift cam for shifting the clutch device from rotary to reciprocatory position for an extreme rearward position of the rocker, an intermediate 90° dwell neutral-to-reciprocatory position cam, and an outermost 180° dwell neutral-to-reciprocatory position shift cam, a clutch shift element associated with each series of superimposed cams movable inwardly into the path of any selected cam of the series, and pattern means including bumps of selected height for shifting each shift element inwardly into the path of the selected side cam.

4. In a circular knitting machine for knitting hosiery and other fabrics ornamented in solid color patterns, a rotatable needle cylinder, independently movable needles in the cylinder, means for supplying yarn to the needles including means for changing the feeding yarn, suitable needle actuating and control devices providing a yarn feeding station and a driving mechanism for the cylinder including a rotary clutch driver, a reciprocatory clutch driver, a driving gear continuously driven in timed relation to the rotary driver, a rocker arm connected to actuate the reciprocatory driver, and a crank connection from the driving gear for recipocating the rocker, a clutch device in said driving mechanism shiftable between rotary and reciprocatory driving positions and to an intermediate neutral position, said clutch device having four fixed engaging positions with the reciprocatory driver each succeeding position representing a 90° shift in the limits of reciprocatory movement of the needle cylinder, and a clutch shifting device comprising a cylindrical cam hub secured to turn with the driving gear supporting a group of radially superimposed side shift cams selectively operable for moving the clutch device from the reciprocatory driving position to the neutral and to the alternative rotary driving position, and the second series of radially superimposed side shift cams selectively operable for moving the clutch device from the rotary driving position and from the intermediate neutral position to the reciprocatory driving position, a shifter element associated with each group of side cams operatively connected to shift the clutch device and independently movable radially of the cam drum into the path of the selected side cam, and pattern means for controlling the movement of each shifter element.

5. In a circular knitting machine for knitting hosiery and other fabrics ornamented in solid color diamond patterns, an independent needle cylinder operable for rotary and reciprocatory knitting, a needle actuating slider series with selected groups of said sliders having apex butts, needle knitting and control cams including needle narrowing and widening picks and an apex needle activating cam, rotary and reciprocatory driving mechanism for the cylinder including means shiftable between rotary and reciprocatory knitting position and further shiftable during reciprocatory knitting to shift the limits of reciprocatory movement of the cylinder to locate selected groups of said apex needles in knitting position with respect to the reciprocation of the cylinder, and pattern means for controlling said shiftable means to shift said limits of reciprocation of the cylinder and for controlling said apex cam to activate a selected group of apex needles for the starting of a diamond point in any one of said positions of the cylinder.

6. In a circular knitting machine for knitting hosiey and other fabrics ornamented in solid color diamond patterns, an independent needle cylinder operable for forward rotary and forward and reverse reciprocatory knitting, a needle actuating slider series comprising two equal groups of long and short knitting butt sliders and with a selected number of said sliders at the middle and at the ends of each group having apex butts, needle knitting and control cams including needle narrowing and widening picks and an apex needle drawdown cam positioned to operate during the reverse reciprocatory movement of the cylinder in advance of the knitting cams, rotary and reciprocatory driving mechanism for the cylinder including means shiftable between rotary and reciprocatory knitting positions and further shiftable during reciprocatory knitting for effecting selective 90° and 180° shifts in the limits of reciprocatory movement of the cylinder, means for initiating the operation of said shiftable means in advance of a movement of the needle cylinder in the forward direction, and means acting when rendered operative to render said apex cam operative in advance of the immediately following reciprocatory movement of the cylinder in the reverse direction, and pattern means for controlling said shiftable means and apex cam for the starting of diamond points in any selected 90° position of the cylinder.

7. In a double cylinder rib knitting machine for knitting rib top hosiery and other fabrics ornamented in solid color diamond patterns, a pair of opposed needle cylinders movable as a unit, needle actuating sliders in one of said cylinders having long and short knitting butts in two equal groups, transfer butts, and apex needle butts in small groups at spaced intervals about the needle cylinder, a knitting station comprising knitting and control cams acting on said butts including narrowing and widening picks, raise, leveling and transfer cams, and an apex cam for activating selective groups of apex needles, rotary and reciprocatory driving mechanism for said cylinders including means shiftable between rotary and reciprocatory knitting positions and further shiftable during reciprocatory knitting to shift the limits of reciprocatory motion of the cylinder to locate selected groups of said apex needles in the knitting position with respect to the reciprocation of the cylinder, and pattern means for controlling said knitting and transfer cams and said shiftable means to effect the knitting of the rib top and thereafter plain rotary knitting, for controlling said raise and leveling cams and said shiftable means for the knitting of initial complementary narrowed portions of said diamond pattern, for controlling said apex cam and said shiftable means to shift said limits of reciprocation of the cylinder, and for controlling said apex cam to activate selected groups of apex needles for the starting of diamond points to form additional complementary portions of said diamond pattern about the periphery of the cylinder.

8. The method of knitting a diamond pattern leg stocking on a circular knitting machine having a needle cylinder operable for rotary and reciprocatory knitting, needle actuating and control devices including needle sliders one half with long and one half with short knitting butts, a group of apex needle sliders in each quadrant of the cylinder having apex draw-down butts, suitable needle actuating cams, a clutching device shiftable between rotary and reciprocatory knitting positions and further shiftable for effecting selected 90 and 180 degree shifts in the limits of reciprocatory movement of the cylinder, which method comprises the steps of rotary knitting the stocking top, with reciprocatory knitting and narrowing knitting a half diamond to a point on the short knitting butt needles only, with a 180° cylinder shift and narrowing knitting a half diamond to a point on the long knitting butt needles only, with a 90° cylinder shift and with a starting group of apex needles and with widening followed by narrowing knitting a complete diamond on half long and half short knitting butt needles, with a 180° cylinder shift similarly knitting a second complete diamond with a 90° cylinder shift and with a starting group of apex needles centrally of the long knitting butt needle group and with widening knitting a half diamond to the full width of the long knitting butt series with a 180° cylinder shift and with a starting group of apex needles centrally of the short knitting butt needle group and with widening knitting a half diamond to the full width of the short knitting butt series, and thereafter knitting the heel, foot, and toe.

9. In a circular knitting machine having superposed needle cylinders for knitting hosiery having a rib fabric section and a plain knit fabric section having solid color suture joined patterned areas, independently movable needles in said cylinders, sliders for moving said needles in said cylinders, yarn feeding means, driving mechanism for said cylinders including a rotary driver, a reciprocatory driver, a clutch means shiftable to engage said rotary and reciprocating drivers, means for shifting said clutch means to engage said rotary driver and to engage said reciprocatory driver in a plurality of fixed positions corresponding to a plurality of predetermined angular positions ot the needle cylinder in relation to said reciprocatory driver, cam means for operating said sliders to distribute said needles in predetermined arrangement between said cylinders and to operate said needles to knit said rib fabric sections, cam means for operating said sliders to transfer said needles to one of said cylinders from the other of said cylinders to provide a complete complement of needles in said one cylinder, and cam means for operating said sliders to operate said needles during engagement of said clutch means with said reciprocatory driver in said plurality of fixed positions to knit said suture joined patterned areas in said plain knit fabric section.

10. In a circular knitting machine having two rotary needle beds for knitting articles having a ribbed fabric section and a plain knit fabric section having at least four coursewise adjacent suture-joined intarsia areas, independently movable needles for said beds, means for feeding yarn to said needles, driving means for rotating said beds through continuous rotary and reciprocating movements, including a rotary driver and a reciprocatory driver and clutch means automatically shiftable to engage said rotary and reciprocatory drivers, means for shifting said clutch means to engage said rotary driver and to engage said reciprocatory driver in a plurality of fixed positions corresponding to a plurality of predetermined angular positions of the needle beds in relation to said reciprocatory driver, automatic means for operation when said clutch means is shifted to engage said rotary driver to cause needles of said beds to cooperatively knit rib fabric, and automatic means for operation when said clutch is shifted to engage said reciprocatory driver in said plurality of fixed positions to cause needles of one of said beds to knit at least four coursewise adjacent suture-joined intarsia areas.

References Cited in the file of this patent

UNITED STATES PATENTS

| | | |
|---|---|---|
| 1,790,632 | Weidner | Jan. 27, 1931 |
| 1,841,205 | Page et al. | Jan. 12, 1932 |
| 1,853,519 | Page | Apr. 12, 1932 |
| 1,853,520 | Page | Apr. 12, 1932 |
| 1,945,227 | Montagne et al. | Jan. 30, 1934 |
| 2,237,143 | Houseman | Apr. 1, 1941 |
| 2,527,534 | Ellis | Oct. 31, 1950 |